United States Patent
Najda et al.

(10) Patent No.: US 7,035,208 B1
(45) Date of Patent: Apr. 25, 2006

(54) REVERSE STATISTICAL MULTIPLEXING TO ACHIEVE EFFICIENT DIGITAL PACKING WITH LINK PROTECTION

(75) Inventors: Joseph J. Najda, Susscasunna, NJ (US); D. Reagan Rice, Morristown, NJ (US); Allen M. Rush, Millburn, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/449,649

(22) Filed: Nov. 30, 1999

(51) Int. Cl.
*H04J 1/16* (2006.01)

(52) U.S. Cl. .................... 370/227; 370/228; 370/243

(58) Field of Classification Search ........ 370/216–222, 370/226, 228, 243, 357, 360, 375, 376, 535, 370/536
See application file for complete search history.

(56) References Cited

U.S. PATENT DOCUMENTS

| | | | | |
|---|---|---|---|---|
| 5,469,428 A | * | 11/1995 | Tokura et al. .............. | 370/224 |
| 5,636,215 A | * | 6/1997 | Kubo et al. ................. | 370/397 |
| 5,949,755 A | * | 9/1999 | Uphadya et al. ............ | 370/224 |
| 6,198,744 B1 | * | 3/2001 | Huggins et al. ........ | 370/395.51 |
| 6,262,820 B1 | * | 7/2001 | Al-Salameh ................ | 359/119 |
| 6,301,254 B1 | * | 10/2001 | Chan et al. ................. | 370/397 |
| 6,317,414 B1 | * | 11/2001 | Naohiro ...................... | 370/222 |
| 6,473,397 B1 | * | 10/2002 | Au ............................. | 370/223 |
| 2002/0075798 A1 | * | 6/2002 | Sekine et al. ............... | 370/228 |

* cited by examiner

*Primary Examiner*—Huy D. Vu
*Assistant Examiner*—Daniel Ryman

(57) ABSTRACT

An asynchronous transfer mode network, in accordance with the present invention, includes a plurality of remote terminals remotely disposed relative to a central office. The remote terminals are connected by a ring with two paths. The ring transfers signals thereon in opposite directions relative to each path. The central office feeds duplicate signals on each path. Each remote terminal includes a first multiplexer for routing signals transferred on the ring to and from an asynchronous feeder multiplexer. The asynchronous feeder multiplexer is adapted to route components of downstream signals on a first path of the ring to a destination and to replace the components of the signals on the first path with copies of components of signals running in an opposite direction on a second path of the ring such that at any location in the network both paths provide all signals.

17 Claims, 2 Drawing Sheets

REVERSE STATISTICAL MULTIPLEXING TO ACHIEVE EFFICIENT DIGITAL PACKING WITH LINK PROTECTION

BACKGROUND OF THE INVENTION

1. Field of the Invention

The present invention relates to digital networks, and more particularly to a ring configured system for efficiently packing data while restoring service in the event of a failure.

2. Description of the Related Art

Synchronous Optical Network (SONET) configurations available commercially from Lucent Technologies, Inc., using for example, DDM-2000 equipment, can provide service using a ring configuration which permits a multiplicity of de-multiplex sites, each feeding a customer location, and also provides protection switching for the SONET equipment to restore service in the event of a failure of one link in the optical network.

Unfortunately, this combination of features cannot be readily applied to service configurations using Asynchronous Transfer Mode (ATM) transmission of broadband signals, such as those using Internet Protocol (IP), without having to deploy extra units of digital bandwidth, many of which are not fully utilized. This situation constitutes an economic barrier to the hoped-for deployment of several ATM transmission systems that will provide greater speed for the download of digital data to Internet end customers. The additional equipment also increases system complexity and handling.

Therefore, a need exists for a multiplexing apparatus and method congruous with ATM transport networks in a SONET ring network that includes the capability of restoring service and maintaining transferred data in the event of a failure of one or more links in the SONET ring.

SUMMARY OF THE INVENTION

An asynchronous transfer mode network, in accordance with the present invention, includes a plurality of remote terminals remotely disposed relative to a central office. The remote terminals are connected by a ring with two paths. The ring transfers signals thereon in opposite directions relative to each path. The central office feeds duplicate signals on each path. Each remote terminal includes a first multiplexer for routing signals transferred on the ring to and from an asynchronous feeder multiplexer. The asynchronous feeder multiplexer is adapted to route components of downstream signals on a first path of the ring to a destination and to replace the components of the signals on the first path with copies of components of signals running in an opposite direction on a second path of the ring such that at any location in the network both paths provide all signals.

Another asynchronous transfer mode network of the present invention includes a first path for connecting a plurality of remote terminal sites and for transferring asynchronous transfer mode signals in a first direction and a second path for connecting the plurality of remote terminal sites and for transferring asynchronous transfer mode signals in a second direction opposite the first direction. A central office is coupled to the first and second paths for feeding duplicate asynchronous transfer mode signals downstream from the central office to the remote terminal sites and for receiving upstream asynchronous transfer mode cells from the remote terminal sites to compare upstream signals and to select a best available upstream signal. The remote terminal sites include a first multiplexer for routing signals transferred on the first and second paths to and from an asynchronous feeder multiplexer. The asynchronous feeder multiplexer is adapted to route components of downstream signals on the path to a destination and to replace the components of the signals on the first path with copies of components of signals running in an opposite direction on the second such that at any location in the network both paths provide all signals.

In alternate embodiments, the asynchronous feeder multiplexer may include protection logic adapted to compare signals received from the opposite directions on the two paths to select a signal to be output. The protection logic may select for the output that signal which remains after a loss of signal has been detected. The protection logic selects, for the output signal, a signal having a best signal quality, e.g., the least number of bit errors. The signals received from opposite directions may include components and the protection logic may selectively choose or merge components of each output signal based on the components having a best signal quality. The network may include a synchronous optical network (SONET) with at least an STS-1 optical bandwidth. The network may include metallic channels in the two paths of the ring, with for example, a DS3 bandwidth.

A method for providing add/drop capability and link protection in an asynchronous network of the present invention includes providing an asynchronous transfer mode network having a plurality of remote terminals remotely disposed relative to a central office. The remote terminals are connected to a ring including two paths which transfer signals thereon in opposite directions relative to each path. Duplicate signals are fed downstream on each from the central office. The signals transferred on the two paths are routed to and from an asynchronous feeder multiplexer at each remote terminal. Components of downstream signals on a first path of the ring are routed to a destination, and the components of the signals on the first path of the ring are replaced with copies of components of signals running in an opposite direction on a second path of the ring such that at any location in the network both paths provide all signals.

In other methods, the step of comparing signals received by the central office from opposite directions on the two paths to select an output signal may be included. The step of comparing signals may include the step of selecting the output signal which remains after a loss of signal has been detected. The step of comparing signals may include the step of selecting the output signal which includes a best signal quality. The step of comparing signals may include the step of merging components of each signal based on the components including a best signal quality.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
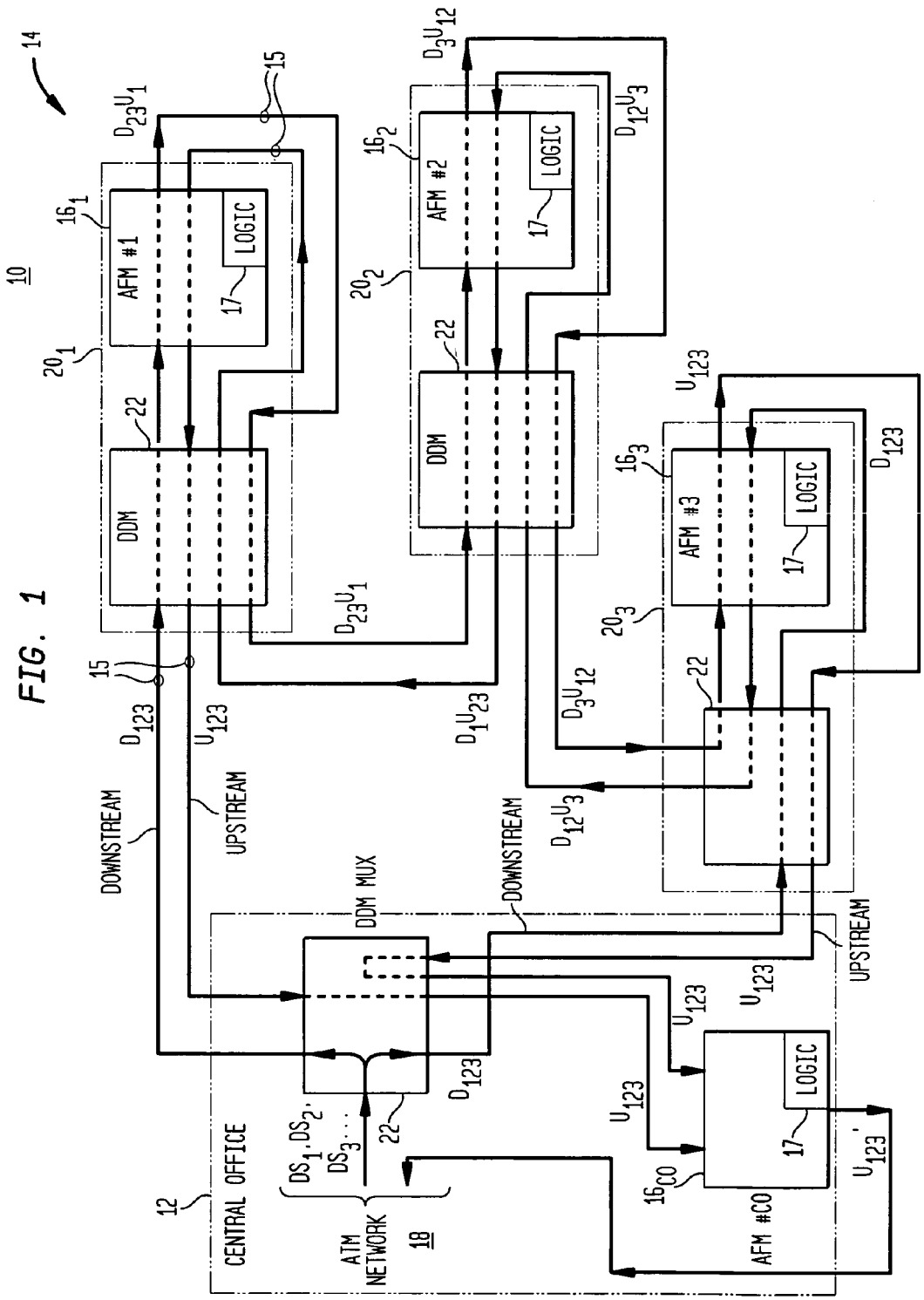
FIG. 1 is a block/flow diagram showing a network/data flow for an asynchronous digital network in accordance with the present invention.

The present invention includes a system and method whereby a multiplexer, preferably a statistical multiplexer (SM), part of an asynchronous transfer mode (ATM) transport network, is designed not only to read out downstream ATM cells (traffic) destined for that location but also to insert (write) into those same cell locations, that continue downstream toward the next site in the ring, copies of the corresponding traffic destined for upstream transport. The SM also receives, in the upstream direction, ATM cells that are identical in content to those downstream cells to be read out. The SM is designed to choose, for the downstream traffic the SM sends to its subtended elements, between the downstream cells it receives in the "normal" downstream direction and those it receives in the normal upstream direction. The SM makes its choice on the quality of the ATM cells' content. A link failure will allow the SM to make a clear decision in favor of the cells that have passed through the good segments of the ring.

Regarding ATM cells headed upstream, the SM feeds identical copies of the cells it receives from its subtended elements into the normal upstream transport path and also into the normal downstream path as mentioned. At the hub end of the ring, where duplicate copies of the ATM traffic are normally received from opposite directions on the ring, the transport equipment can select the received leg that has not suffered a transmission failure, not suffered from a decrease in transmission quality or is consistent with a default choice when there is no failure or quality problem.

The invention permits for a single digital rate signal, such as, for example, one at the third level (Digital Signal 3 (DS3) over a metallic channel, STS-1 when converted to optical format), to carry traffic at full capacity, supplying the several SMs at their downstream sites with ATM cells that begin their downstream journey fully packing the cell capacity of, for example, the STS-1 component of the optical facility. It should be noted that Digital Signal 1 (DS1) or other levels may also be employed for electrical or optical transmission.

At each downstream site ATM cells are dropped off to the subtended elements (e.g., remote terminals), until at the last site in that direction the remaining ATM cells are dropped off. Wherever ATM cells are dropped, those cell positions are replaced with copies of upstream cell traffic. In the event of a link failure (e.g., fiber/cable cut) all the ATM cells designated for each site are still available for accurate reception by the SM at that site, and all the ATM cells transmitted upstream are available for reception by the ATM network element at the central office end.

The prior art for effecting link protection on a ring with multiple downstream sites ("add/drop" capability) depends on a traffic format that is based on dividing the transmitted signal into its fixed DS1 or DS3 components. Advantageously, the ATM service application of the present invention includes a digital format with capacity, which is dynamic, that is, a portion of the downstream signal can be dropped off at a site and the site/cell map can be changed easily and remotely. Further, the digital format can be an extension of existing ATM technology.

The present invention permits existing ring networks with deployed remote terminals of digital loop carrier (DLC) systems to support the enhancement of the DLCs to provide broadband transport of ATM protocol signals. These ATM protocol signals may be used to offer much faster downloading of information, such as, for example, Internet graphics. The present invention permits a service provider, such as, a telephone company, to operate a network adding ATM capability without being forced to expand the costly cable facilities comprising the network. The present invention may be employed, for example, in the AnyMedia Access System, the SLC-2000 Access System, and the SLC Series 5 Carrier System DLCs.

Referring now to the drawings in which like numerals represent the same or similar elements and initially to FIG. 1, an information transfer network 10 is illustratively shown for one embodiment of the present invention. Information transfer network 10 may include a central office 12 where incoming and outgoing connections are routed to one or more data transfer networks. Information transfer network 10 preferably includes a ring 14 for data transfer to occur. Ring 14 preferably includes a synchronous optical network (SONET) ring; however, electrical rings may be employed. Ring 14 includes an upstream flow (upstream) and a downstream flow (downstream) to provide redundant data packets or cells traveling through network 10. Upstream or downstream is referenced relative to central office 12. Information leaving central office 12 travels downstream, while information traveling to the central office 12 is traveling upstream.

In accordance with the present invention, an asynchronous transfer mode (ATM) cell-based signal is applied to ring 14 from an ATM network 18 which connects from an "edge" element such as an ATM router. Multiplexers 16, preferably, ATM feeder multiplexers (AFMs), are employed to route information in cells in both the upstream and the downstream directions. In a preferred embodiment, a unidirectional path switched ring (UPSR) 15 including two paths carrying oppositely directed signals is employed, which achieves both add/drop and link protection capability in accordance with the invention. Both features are achieved by employing multiplexers 16 in accordance with the invention at each remote terminal site 20. Each site 20 may include a location where information cells carried by network 10 are received (i.e., the destination of the data). Each multiplexer 16 is employed at each site 20 with a multiplexer 22, preferably a digital data multiplexer (DDM). Multiplexers 16 may be employed as terminals of an optical fiber network or an electrical network (e.g., using copper cable). An example of ATM feeder multiplexer (AFM) may include an LPA900 AFM-DS3 available commercially from Lucent Technologies, Inc., which is enhanced to support the present invention.

Multiplexer 16 is adapted for ATM transfers in, for example, a synchronous network (e.g., SONET) in ring 14. Multiplexers 22 may include, for example, a DDM 2000 available commercially from Lucent Technologies, Inc.

Beginning at central office 12 and following two downstream paths, downstream signals are double fed into ring 15 in opposite directions. An information component or "cell", signal $D_{123}$, is directed down ring 15 to multiplexer 22 at site $20_1$ and is processed by multiplexer $16_1$. The cell delivers a portion of its contents to site $20_1$ and outputs cell $D_{23}U_1$. In this way, a portion of the information $D_1$ is supplied to its destination site $20_1$ and upstream information $U_1$ passing through site $20_1$ is incorporated into the cell position previously occupied by $D_1$. $D_{23}U_1$ is multiplexed and transferred to a next site $20_2$. At site $20_2$, multiplexer 22 outputs $D_{23}U_1$ to multiplexer $16_2$, where $D_2$ is received at site $20_2$ and upstream contents $U_2$ are received and installed in place of $D_2$. A new composite cell is output to multiplexer 22 as $D_3U_{12}$. Again, information addressed for the given site $D_2$ is received at the site and the contents of the cell are replaced with $U_2$; $U_2$ is also launched onto the ring with information flow in the opposite direction. $D_3U_{12}$ is received by multiplexer 22 at site $20_3$ and routed to multiplexer $16_3$. Information $D_3$ is received at site $20_3$ and replaced with $U_3$. Now, a $U_{123}$ signal is routed through multiplexer 22 at site $20_3$ and is returned to multiplexer 22 at central office 12. It is to be understood that all information present on ring 14 is available on each of the two paths, at each remote terminal site 20 and at central office 12. In case of a failure of one path, all data/information is capable of being retrieved.

At central office 12, information signals that were duplicated and sent downstream in the opposite direction as described above, are now described. Processing of the signals is provided as above except at site $20_3$; $D_{123}$ is input, and $D_{12}U_3$ is output. At site $20_2$, $D_{12}U_3$ is input, and $D_1U_{23}$ is output. At site $20_1$, $D_1U_{23}$ is input and $U_{123}$ is output and returned to central office 12. $U_{123}$ from both directions are received in multiplexer 22 of central office 12. Both $U_{123}$ signals are compared for each component, e.g., $U_1$ and $U_1$ are compared, $U_2$ and $U_2$ and $U_3$ and $U_3$, etc. Multiplexer $16_{co}$ is employed for comparing the signals and selecting the "healthiest" one, i.e. the signal with fewer bit errors. An automatic protection switch (APS) or logic device 17 may be included on each multiplexer 16 to determine the best signal or signal component of between the two paths of ring 15 for delivery to the destination of the data. The components of each signal may be merged to form a best resultant signal or simply to select a remaining signal if one uni-directional path of ring (UPSR) 15 fails, e.g., a fiber or wire break. The selected output signal $U_{123}'$ may then be sent to other networks.

Figure 2:
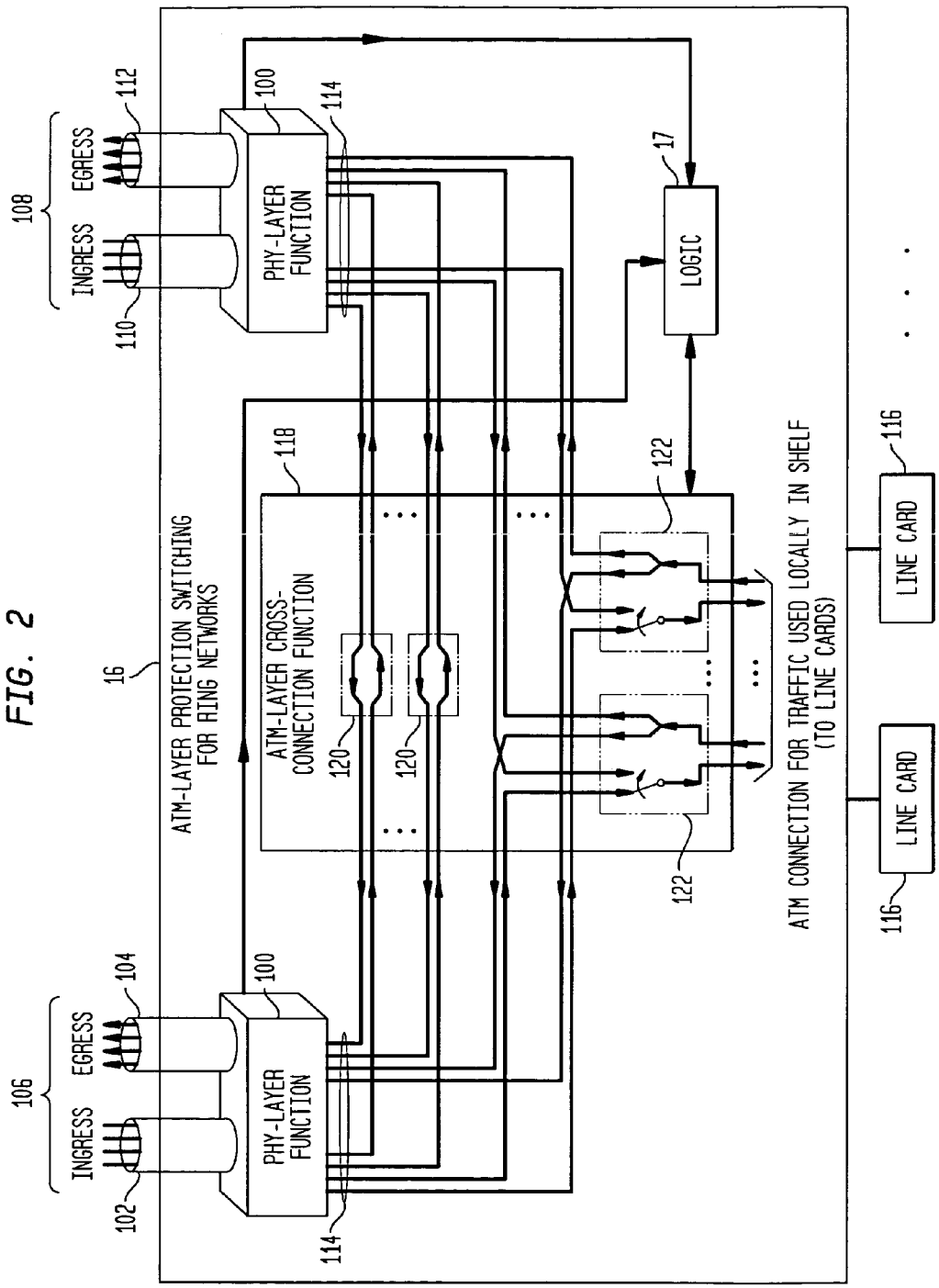
FIG. 2 is a block/flow diagram showing an ATM feeder multiplexer and data flow in accordance with the present invention.

Referring to FIG. 2, an ATM feeder multiplexer (AFM) 16 is shown in greater detail. AFM 16 includes an ingress port 102 and an egress port 104 for a first side 106 of ring 15. First side 106 corresponds with a portion of one path of uni-directional path switched ring 15 (FIG. 1). A second side 108 includes an ingress port 110 and an egress port 112 which provides a portion of the other path of uni-directional path switched ring 15 (FIG. 1). A plurality of connections 114 provide appropriate input and output connections for multiplexer 16 at an ATM layer to provide the appropriate cross-connections for transferring information between upstream and downstream paths as described above. Multiplexer 16 interfaces with a line card 116, for example, an asynchronous digital subscriber line card (ADSL) plug-in such as one coded LPA400 available commercially from Lucent Technologies, Inc.

In accordance with the invention, whatever downstream ATM cells are read and sent to the ADSL line cards 116 are replaced by corresponding upstream ATM cells from the same set of line cards 116. This feature of the present invention provides a unidirectional path switched ring (UPSR) which has the capabilities for add/drop of cells and link protection in which information is redundantly available at each site.

At the physical layer 100, physical signal ingress is monitored and loss of signal or AIS (Alarm Indication Signal) is reported to switches for making proper connection to select the "healthiest data" as will be described. "Healthy criteria" include bipolar violation and loss of signal (LOS) at the DS3 level, and/or misrouted cells and header check error at the ATM layer. At the ATM layer cells are monitored for virtual connection ingress and a report is issued if an indication of a virtual path-AIS (VP-AIS) or virtual channel-AIS (VC-AIS) condition is detected.

ATM pass-through switches 120 are included in multiplexer 16. ATM pass-through switches 120, which operate on ATM cells that are not destined for drop-off at this site, are employed as follows. If a physical signal failure, for example, a DS3 LOS, is detected at the ingress 102 of first side 106, then ATM alarm information is sent from the ingress 102 of first side 106 to the egress 112 of second side 108. If a physical signal failure is detected at the ingress 110 of second side 108, then ATM alarm information from the ingress 110 of second side 108 is sent to the egress 102 of first side 106. If no physical failures are detected, then ATM cells are passed-through to the egress of the same side.

ATM cross-connections 122 are employed to bridge the egress 104 of first side 106 to the egress 112 of second side 108. ATM cross-connections 122 are also employed to select between ingress 102 and ingress 110 based on the detected physical ingress state of cells received. Multiplexer 16 is capable of selecting the valid downstream signal from the ATM signals going in both upstream and downstream directions. Protection logic 17 provides decision making logic to select between duplicate signal components to provide the best signal. Logic 17 may include a default setting which is changed if loss of signal or an alarm indication signal is triggered, or a decision may be made based on signal analysis provided by logic 17. Logic 17 receives DS3 level alarm information from both physical layers 100, and ATM alarms from ATM cross-connection device 118 and conveys its conclusions to pass-through switches 120 and ATM cross-connections 122. Logic 17 may be included as part of cross-connection device 118. Logic 17 may be employed at remote stations to compare components of the signals traveling along ring 15. In this way, a best signal is chosen for delivery at its destination. For example, logic 17 may be employed to compare $D_3$ of $D_{123}$ and $D_3$ of $D_3U_{12}$ at site $20_3$ of FIG. 1.

Advantageously, the present invention permits efficient data packing by filling locations vacated by data delivered at a site with data to be sent upstream. By properly selecting the data which is used to replace delivered data, the present invention provides link protection. The data present at any location on ring 15 is cumulatively all the signals on the network, such that despite the several data exchanges, the dual ring has complete continuity. In the event of a failure, no data is lost since the data for a location is available in duplicate at all remote terminals.

Having described preferred embodiments of a system and method of reverse statistical multiplexing to achieve efficient digital packing with link protection (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A remote terminal in an asynchronous transfer mode network, comprising:
   a first path for receiving a first cell with a first plurality of components;
   a second path for receiving a second cell with a second plurality of components;
   a first multiplexer for routing received first and second cells to and from an asynchronous feeder multiplexer, the asynchronous feeder multiplexer for replacing less than all of the first plurality of components in the first cell with less than all of the second plurality of components in the second cell, wherein the first cell on the first path runs in an opposite direction as the second cell on the second path such that at any location in the network both the first and second cells are available.

2. The remote terminal of claim 1, wherein the asynchronous feeder multiplexer includes protection logic adapted to compare the first cell with the second cell to select a cell to be output.

3. The remote terminal of claim 2, wherein the protection logic selects for the output the cell which remains after a loss of signal for at least one of the first cell and the second cell has been detected.

4. The remote terminal of claim 2, wherein the protection logic selects for the output the cell having a best signal quality.

5. The remote terminal of claim 2, wherein the cell to be output includes at least one of the first plurality of components and at least one of the second plurality of components.

6. The remote terminal of claim 5, wherein the selected components in the cell for output are selected based on a best signal quality of the components.

7. The remote terminal of claim 1, wherein the remote terminal is a portion of a network.

8. The remote terminal of claim 7, wherein the network is a synchronous optical network (SONET).

9. The remote terminal of claim 8, wherein the network employs at least an STS-1 optical bandwidth.

10. The remote terminal of claim 7, wherein the network includes metallic channels in the first path and the second path.

11. The remote terminal of claim 10, wherein the network employs DS3 bandwidth.

12. A method of communication at a remote terminal in an asynchronous transfer mode network including the remote terminal of claim 1.

13. A method of communication at a remote terminal in an asynchronous transfer mode network, comprising:
    receiving a first cell with a first plurality of components from a downstream path;
    receiving a second cell with a second plurality of components from an upstream path; and
    replacing less than all of the first plurality of components in the first cell with less than all of the second plurality of components in the second cell, wherein the first cell on the first path runs in an opposite direction as the second cell on the second path such that at any location in the network both the first and second cells are available.

14. The method of claim 13, further comprising:
    outputting the first cell including replaced components on at least one of the downstream path and the upstream path.

15. The method of claim 13, wherein the replacing is determined by a signal characteristic of the first plurality of components and the second plurality of components.

16. The method of claim 15, wherein the signal characteristic is a best signal quality.

17. The method of claim 15, wherein the signal characteristic is a remaining signal after a signal loss.

* * * * *